(12) United States Patent
Morel

(10) Patent No.: US 8,253,741 B2
(45) Date of Patent: Aug. 28, 2012

(54) SYSTEM AND METHOD FOR CREATION OF PERSPECTIVE IMAGES GENERATED BY A NEGATIVE EXPONENTIAL ALGORITHM

(75) Inventor: Carlos Medicis Morel, Rio de Janeiro (BR)

(73) Assignee: Fundação Oswaldo Cruz, Rio de Janeiro (BR)

( * ) Notice: Subject to any disclaimer, the term of this patent is extended or adjusted under 35 U.S.C. 154(b) by 575 days.

(21) Appl. No.: 12/516,045

(22) PCT Filed: Nov. 28, 2007

(86) PCT No.: PCT/BR2007/000325
§ 371 (c)(1),
(2), (4) Date: May 22, 2009

(87) PCT Pub. No.: WO2008/064447
PCT Pub. Date: Jun. 5, 2008

(65) Prior Publication Data
US 2010/0045677 A1 Feb. 25, 2010

(30) Foreign Application Priority Data
Nov. 28, 2007 (BR) .................................... 0606106

(51) Int. Cl.
*G06T 15/20* (2011.01)
(52) U.S. Cl. ........ 345/427; 345/419; 345/586; 345/607; 382/154; 382/293
(58) Field of Classification Search .......... 345/419–427, 345/586, 607; 382/154, 293
See application file for complete search history.

(56) References Cited

U.S. PATENT DOCUMENTS

| 7,693,325 B2* | 4/2010 | Pulla et al. | 382/154 |
| 2001/0005209 A1* | 6/2001 | Lindholm et al. | 345/506 |
| 2001/0045951 A1* | 11/2001 | Allen | 345/419 |
| 2003/0063087 A1* | 4/2003 | Doyle et al. | 345/422 |
| 2003/0202695 A1* | 10/2003 | Chang | 382/190 |
| 2007/0002040 A1* | 1/2007 | Oldroyd | 345/419 |

OTHER PUBLICATIONS

Xiaowen, Li et al.; Nov. 1986; Geometric-Optical Bidirectional Reflectance Modeling of a Conifer Forest Canopy; Transactions on Geoscience and Remote Sensing; vol. GE-24, No. 6.*

* cited by examiner

*Primary Examiner* — Xiao M. Wu
*Assistant Examiner* — Todd Buttram
(74) *Attorney, Agent, or Firm* — Caesar, Rivise, Bernstein, Cohen & Pokotilow, Ltd.

(57) ABSTRACT

A system for creation of perspective images of the present invention includes: A new method for transforming three-dimensional (3D) world coordinates into two-dimensional (2D) screen coordinates using a negative exponential algorithm, instead of the classical projection algorithms that have the distance 'z' to the observer in the denominator (division algorithms); A new method for generating realistic perspective images of objects located at any distance from the observer (positive, negative or zero distances) that does not need any correction for zero or negative distances; The demonstration of practical use of the invention by computer graphics programs that generates and displays perspective images based on this exponential algorithm.

5 Claims, 4 Drawing Sheets

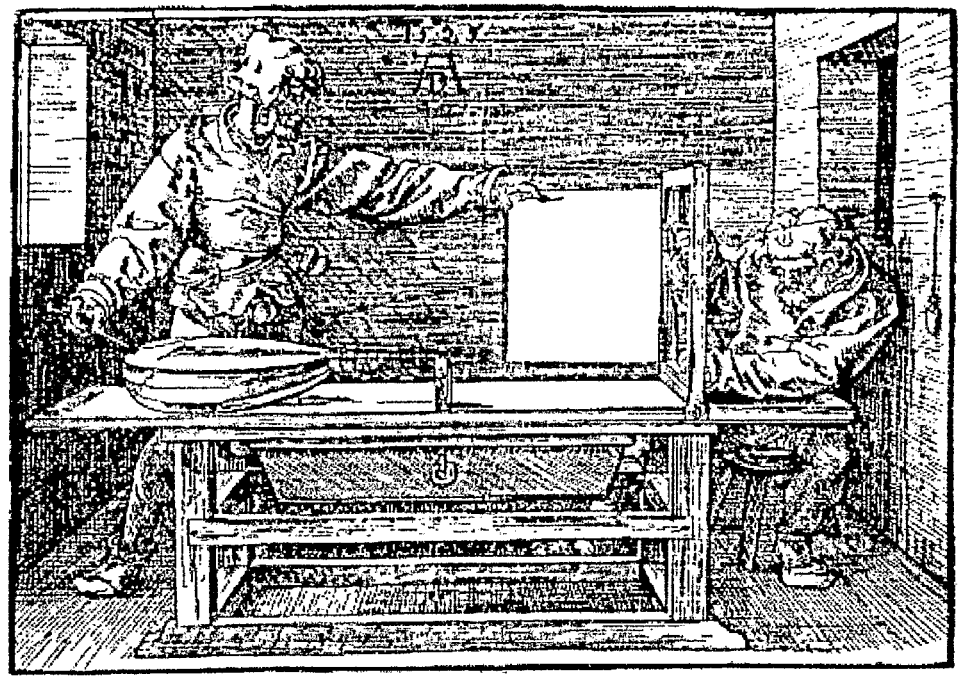
Figure 1
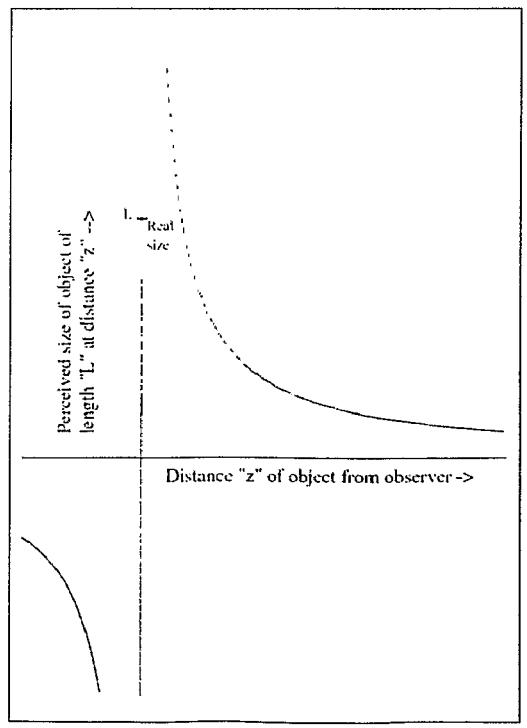
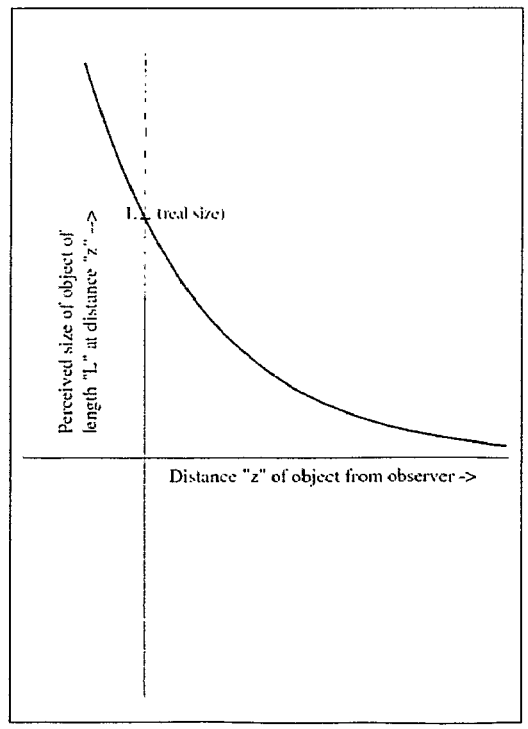
Figure 2A　　　　　　　　　　Figure 2B

SYSTEM AND METHOD FOR CREATION OF PERSPECTIVE IMAGES GENERATED BY A NEGATIVE EXPONENTIAL ALGORITHM

FIELD OF THE INVENTION

This invention relates to a system and a method for generating perspective images which does not use the classical approach of perspective projection. Instead of projecting images of a 3D object into a 2D plane, which requires the division of the object coordinates by their distances to the projecting plane, the invention applies a negative exponential function to calculate directly the screen coordinates from the world coordinates of the object.

BACKGROUND OF THE INVENTION AND PRIOR ART

Perspective images can be generated by artists, photographic techniques and/or computer-based approaches. The basic principles for the generation of perspective pictures were discovered in the sixteenth century by Italian artists and in particular by the Florentine architect and engineer Filippo Brunelleschi, who carried out a series of experiments leading to a mathematical theory of perspective ("The Science of Art: Optical Themes in Western Art from Brunelleschi to Seurat". By M. Kemp. Yale University Press, 1990).

The fundamental operation consists of projecting a three-dimensional object to a two dimensional representation of this object on a plane. Renaissance artists relied on different approaches to carry on this task including the use of the "perspective machine" designed by Albrecht Durer (FIG. 1) and the "camera obscura" invented in the $16^{th}$ century as a pinhole camera (without lenses). The invention of photography, which captures the projected image on a photographic plate or film, represented a major step forward.

The method for the generation of 3D perspective pictures by computers uses until today the same basic principles of perspective projection discovered during the Renaissance, which requires dividing by the depth of each point. The said method is based on mathematical equations where the distance "z" from the object to the projection plane goes into the denominator, introducing the characteristic "perspective foreshortening", responsible for making remote parts on an object appear smaller than nearer parts. Denominators, however, "have a nasty way of evaluating to zero" ("Computer Graphics: Using Open GL", $2^{nd}$ edition. By Hill, F. S., Jr. Prentice Hall; 2001, pp. 373 (ISBN 0-02-354856-8). This is clearly pointed out by Upstill ("The RenderMan Companion. A Programmer's Guide to Realistic Computer Graphics". By Upstill, Steve. Reading, Mass.: Addison-Wesley Publishing Company; 1990, pp. 1-475 (ISBN 0-201-50868-0). "Perspective transformations cause division by zero for points at z=0, and they give bizarre results for points in negative z. Therefore they should be used with great care". The eminent computer graphicist Jim Blinn also calls attention to these issues when discussing perspective transformations: "Having a program die because of a zero divide error is a most unpleasant experience" (A Trip Down the Graphics Pipeline". By J. Blinn. Morgan Kaufmann Publishers, Inc., San Francisco, 1996, pp. 131).

The graph of FIG. 2A shows why this problem happens: As the distance z moves through zero and into negative values, the mathematical function of division suffers a discontinuity during this transition from positive to negative values. Current software tools for generating perspective pictures are therefore obliged to introduce limitations and/or approximations such as, respectively: (i) The process known as "clipping" to remove "offending points" (those lying too close to zero or having negative values) before trying to project them (Hill, 2001); (ii) The adoption of "weak-perspective" camera models which turn the non-linear fundamental division equations into linear equations by placing the scene points far away from the viewing camera ("Introductory Techniques for 3-D Computer Vision". By E. Trucco and A. Verri. Prentice Hall, 1998, pp. 26-28).

SUMMARY OF THE INVENTION

The present invention relates to a system and a method for generating perspective images which does not use the classical approach of perspective projection. Instead of projecting images of a 3D object into a 2D plane, which requires the division of the object coordinates by their distances to the projecting plane, the invention applies a negative exponential function to calculate directly the screen coordinates from the world coordinates of the object. This approach eliminates the problems associated with the classical mathematical theory of perspective which is based on division algorithms that cannot handle zero or negative distances. Computer systems adopting this invention can generate realistic, distortion-free perspective pictures of objects located at any distance from the observer (positive, negative or zero).

The invention described here overcomes the problem of the state of the art (remote parts on an object appear smaller than nearer parts) through the use of a negative exponential algorithm to calculate the 2D screen coordinates from the 3D world coordinates, completely avoiding the division operation.

FIG. 2B displays the mathematical function describing the screen size of an object located at a distance z from the observer according to this negative exponential function: The object looks smaller as z increases, which is the basic property of perspective transformation; however, in contrast to the classical perspective approaches, there is no discontinuity of the mathematical function: the object has life size when located at zero distance from the observer and is bigger than life size for imaginary negative distances. A major difference between the division function (FIG. 2A) and the exponential function (FIG. 2B) is therefore this regular behavior of the latter which does not show the discontinuity of the former.

As stated by Casselman, "Perspective in 3D is a crucial ingredient in any graphics toolkit" ("Mathematical illustrations: A manual of geometry and PostScript". By Casselman, Bill: Cambridge, UK: Cambridge University Press; 2005, pp. 162 (ISBN 0-521-54788-1). All the contemporary computer graphics or computer vision toolkits available today for the generation or analysis of perspective images are without exception based on the classical division algorithm, as can be seen for example in U.S. Pat. Nos. 3,602,702; 5,771,046; 6,900,806; 6,947,611. In fact, the division algorithm is considered a fundamental step in creating perspective images, as illustrated by the following citations:

"... the division by the distance of the centre of perspective from the view plane is an essential (italics in the original) aspect of this projection. Division is always necessary and cannot be avoided" ("An Introductory Course in Computer Graphics" ($2^{nd}$ edition). By R. Kingslake. Chartwell-Bratt (Publishing and Training) Ltd, 1991, pp. 70.

"The perspective transformation is fundamentally different from those for rotation, translation, and scaling: it involves dividing (italics in the original) by the $z_e$ coordinate value, whereas the others involve only multiplication and addition. Generating a true perspective image requires dividing by the depth of each point (italics in the original) ("Principles of Interactive Computer Graphics" (2$^{nd}$ edition). By W. M. Newman and R. F. Sproull. McGraw-Hill International Editions, 1981, pp. 341).

Because of this perceived 'essentiality' of the division algorithm, there is no Prior Art describing the use of exponential algorithms to generate perspective pictures which is the core of the present invention.

BRIEF DESCRIPTION OF THE DRAWINGS

FIG. 1 shows an engraving from the artist Albrecht Duhrer.

FIG. 2A shows a graph of the division function used in classical perspective projections or transformations.

FIG. 2B shows a graph of the negative exponential function used in accordance with the present invention.

DETAILED DESCRIPTION OF THE INVENTION

The method of the present invention consists of the following steps:

(a) encoding the image of an object as a series of data elements to coordinate location;

(b) applying a new algorithm, based on negative exponential functions, to generate regular or stereoscopic perspective pictures;

(c) The transformation of 3D world coordinates into 2D screen coordinates by software implementations using this algorithm;

(d) The use of computer graphics systems for displaying, storing, printing or analyzing exponential perspective pictures.

In order to show the principles and advantages of the present invention, it is make reference to FIGS. 1, 2A and 2B. FIG. 1 which shows an engraving from the artist Albrecht Duhrer explaining the functioning of a typical "perspective machine" and its use by painters. The coordinates of the object to be pictured are 'projected' onto a screen with the help of a cord hold by an assistant.

FIG. 2A is a graph of the division function used in classical perspective projections or transformations. The discontinuity of this function, as the independent variable moves from positive to negative values, introduces serious problems which have to dealt with either by avoiding these distances or by the use of correction methods such as "clipping" (Hill, 2001)

FIG. 2B is a graph of the negative exponential function used in the invention. The smooth behavior of the function allows the generation of perspective images of objects situated at any distance from the observer.

It is worth calling the attention that when the object is at "zero" distance from the observer it is displayed at its life size (in contrast, the classical division algorithm of FIG. 1A cannot be used at this distance z=0 for the size of the object would tend to infinity).

Basic Algorithm

The algorithm which is the basis of the invention is based on the following negative exponential equation:

$$L_{screen} = L_{world} \times \text{base}^{(-zoom \times (Z_{world} + Z_{obs}))} \quad \text{Equation 1}$$

where:
$L_{screen}$=screen size of an object of size "L" in real world
$L_{world}$=real size of the object
Base=a constant
Zoom=a constant
$Z_{world}$=distance of the object from the screen (or from the observer if Zobs=0)
$Z_{obs}$=distance of the screen from the observer.

Equation 1, whose behavior is displayed in FIG. 2B, states that the perceived length of an object is a negative exponential function of its distance from the observer. The constants "base" and "zoom" can be adjusted to generate telephoto or wide-angle effects.

Now, embodiments of the invention will be described, by way of example only, with reference to the accompanying drawings, in which like reference numbers designate the same or similar things.

Example 1

Figure 3:
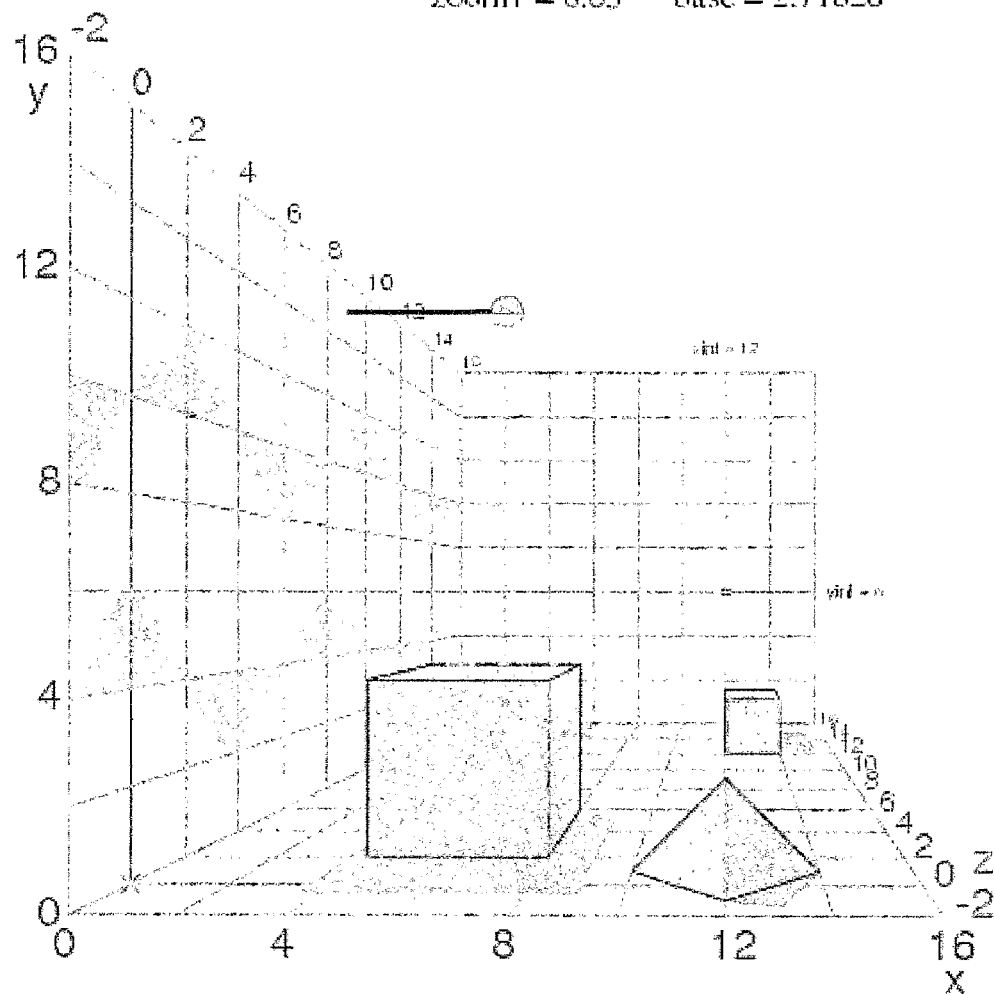
FIG. 3 represents the result of an example of computer graphics perspective picture based on the present invention (exponential perspective).

FIG. 3 shows the result of an example of computer graphics perspective picture based on this invention (exponential perspective). Objects can be placed at any distance from the observer or screen, as is the case of the pyramid in this figure (its base spans from −1 to +3, passing through zero, an impossible coordinate range in classical perspective). Note also that there is no distortion of the pyramid or of the sine/cosine curves in the left vertical platform as the "z" coordinate approaches zero and goes into negative "z" distances.

Example 2

Figure 4:
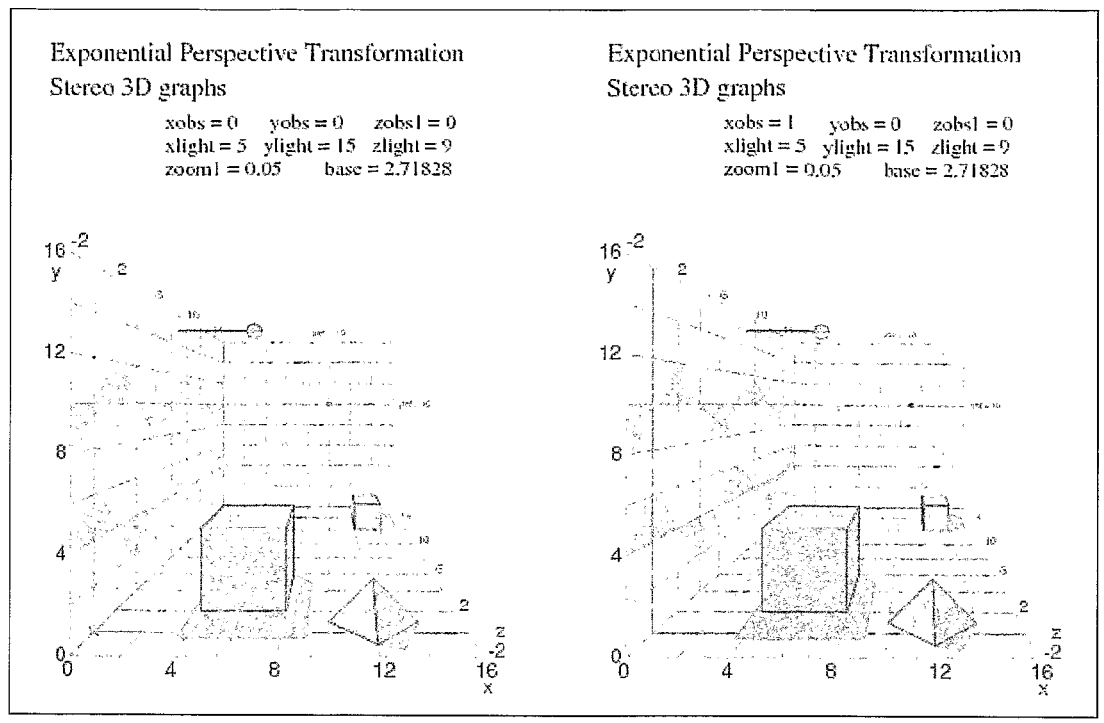
FIG. 4 represents the result of an example of a stereo pair of exponential perspective pictures in accordance with the present invention.

FIG. 4 represents an example of a stereo pair of exponential perspective pictures. An observer can have a stereographic 3D perception when each image is seen by the corresponding eye through the use of special apparatus; some persons can get this perception without the use of any instrument by looking far away or very close so that the two images overlap into a stereo central one.

Example 3

Figure 5:
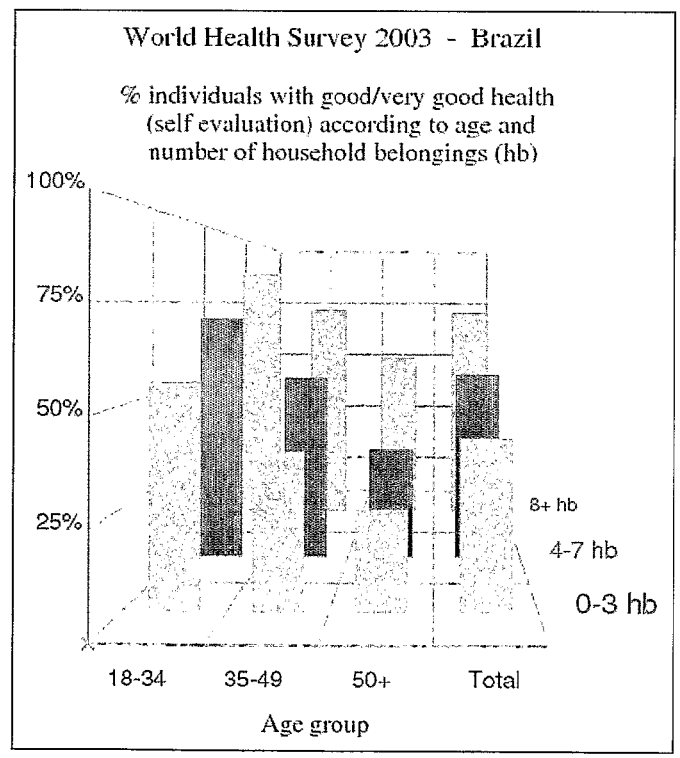
FIG. 5 shows an example of a 3D plot of experimental data involving three dimensions.

FIG. 5 is an example of a 3D plot of experimental data involving three dimensions.

Example 4

Figure 6:
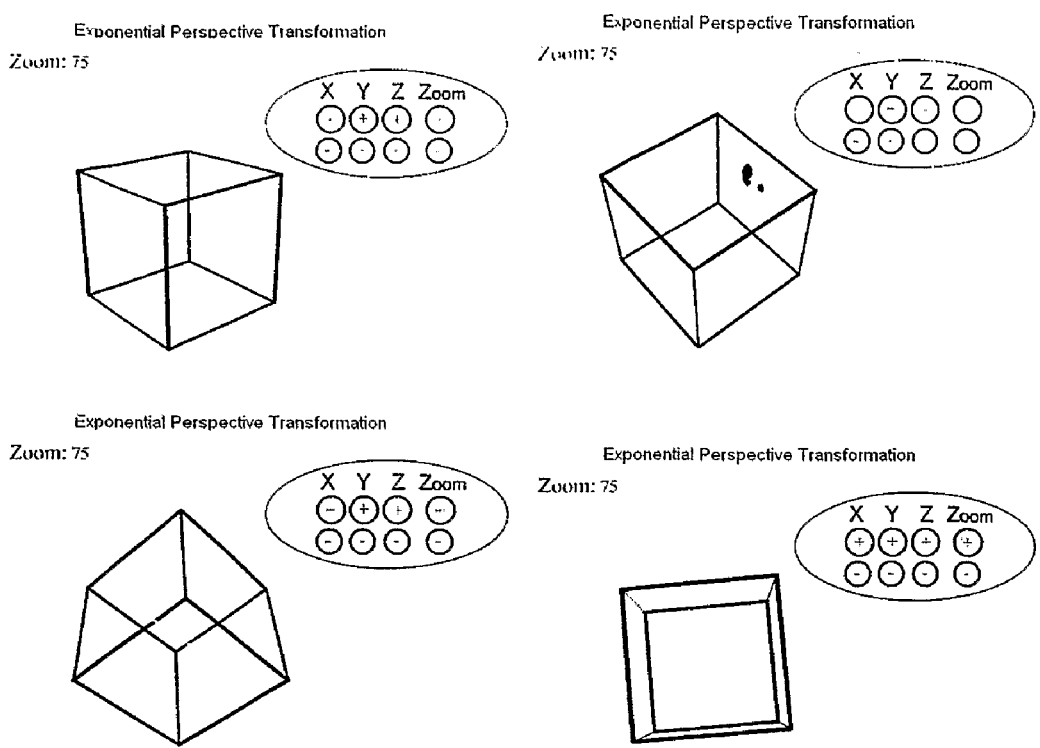
FIG. 6 shows images of a wireframe cube generated by a computer program in real time using the exponential perspective transformation in accordance with the present invention.

FIG. 6 are images of a wireframe cube generated in real time by an interactive computer program based on "Flash" technology. The object can be rotated along the x, y and z axes and placed at different distances from the observer, including zero or negative distances.

The Generation of Exponential Perspective Figures in Computer Graphics

The graphics programming language PostScript is recognized as an efficient tool for generating mathematical illustrations (Casselman, 2005) and was used to demonstrate the practical use of the invention in the generation of FIGS. 3, 4 and 5. FIG. 6 represents the output of a demonstration interactive program that uses Flash technology to draw and manipulate in three dimensions and in real time a wireframe cube model.

The use or adoption of this invention allows generating perspective transformations in new or revised systems, programs, methods or products such as, but not exclusive of flight simulators used for civil or military training of pilots and navigators; flight simulators developed and sold by the entertainment industry; video games playing in dedicated or proprietary platforms; video games playing in open platforms such as, but not exclusive of, internet browsers, mobile cell phones and computer terminals: movies, films, documentaries, videos or DVDs produced by, or making the use of, computer graphics techniques; architectural software for home, interior and landscape design; 3D modeling software; or computer vision systems.

As will be understood by one of skill in the art to which the present invention pertains, various changes and modifications will be apparent. Such changes and substitutions which do not depart from the spirit of the invention are contemplated to be within the scope of the invention which is defined by the claims following.

The invention claimed is:

1. A method for creating a perspective image from an object, said method comprising the following steps:
    (a) encoding an image of the object as a series of data elements to coordinate location;
    (b) applying a new algorithm, based on negative exponential functions, to generate regular or stereoscopic perspective pictures;
    (c) transforming 3D world coordinates ($x_{world}$, $y_{world}$, $z_{world}$) of the object into 2D screen coordinates ($x_{screen}$, $y_{screen}$) using a negative exponential algorithm or function defined by the equation $$L_{screen} = L_{world} \times \text{base}^{(-zoom \times (Z_{world} + Z_{obs}))}; \text{ and}$$

(d) plotting the screen coordinates on a computer display to obtain a graphics output that can be viewed and printed immediately or stored and saved to magnetic or optical media for later display or analysis, where:
    $L_{screen}$=screen size of an object of size "L" in real world;
    $L_{world}$=real size of the object;
    Base=a constant;
    Zoom=a constant;
    $Z_{world}$=distance of the object from screen (or from observer if $Z_{obs}$=0); and
    $Z_{obs}$=distance of the screen from the observer.

2. A method for creating perspective images from a virtual object located at any distance "z" from the virtual observer (in front of the virtual observer: positive "z" distance; behind the virtual observer: negative "z" distance; at the same position of the virtual observer: "z" distance=0) which completely avoids division by distance and therefore does not need any correction such as "clipping" or "weak perspective camera models" for negative or zero "z" distances, using the method of claim 1.

3. The method of claim 1, wherein the perspective image comprises stereoscopic perspective images.

4. A computer program product for creating a perspective image from an object comprising encoded program instructions embodied on a non-transitory computer readable medium for causing a processor to perform the method of claim 1, the instructions being configured for applying a negative exponential function to calculate directly the screen coordinates from the world coordinates of the object.

5. A system adapted to create a perspective image from an object, said system being adapted to perform the following steps:
    (a) encoding an image of the object as a series of data elements to coordinate location;
    (b) applying a new algorithm, based on negative exponential functions, to generate regular or stereoscopic perspective pictures;
    (c) transforming 3D world coordinates ($x_{world}$, $y_{world}$, $z_{world}$) of the object into 2D screen coordinates ($x_{screen}$, $y_{screen}$) using a negative exponential algorithm or function defined by the equation $$L_{screen} = L_{world} \times \text{base}^{(-zoom \times (Z_{world} + Z_{obs}))} \qquad \text{Equation 1}$$

(d) plotting the screen coordinates on a computer display to obtain a graphics output that can be viewed and printed immediately or stored and saved to magnetic or optical media for later display or analysis, where:
    $L_{screen}$=screen size of an object of size "L" in real world;
    $L_{world}$=real size of the object;
    Base=a constant;
    Zoom=a constant;
    $Z_{world}$=distance of the object from screen (or from observer if $Z_{obs}$=0); and
    $Z_{obs}$=distance of the screen from the observer.

* * * * *